Nov. 3, 1953
R. E. L. SPOTSWOOD
LIVE BAIT BOAT
Filed Sept. 29, 1949
2,657,496
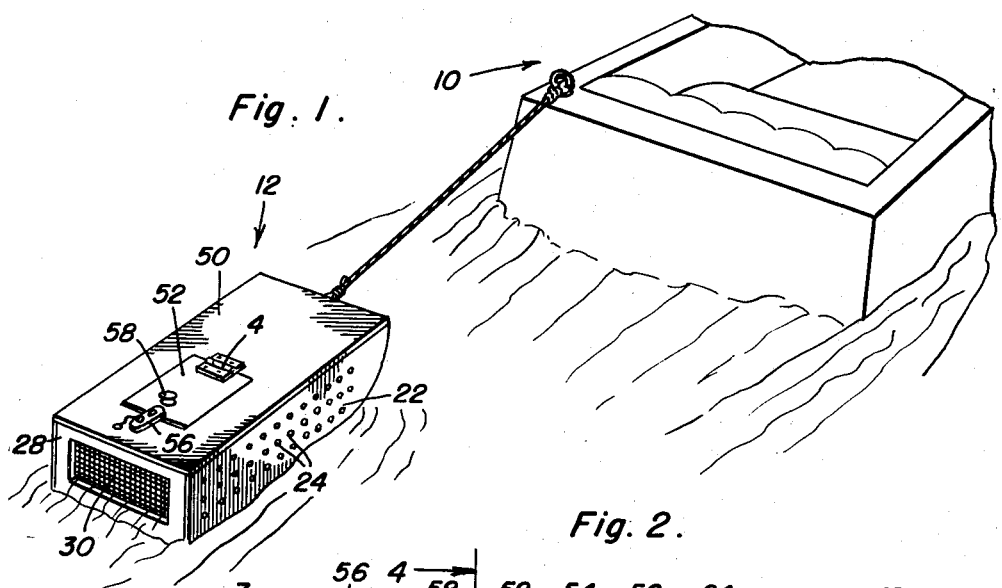
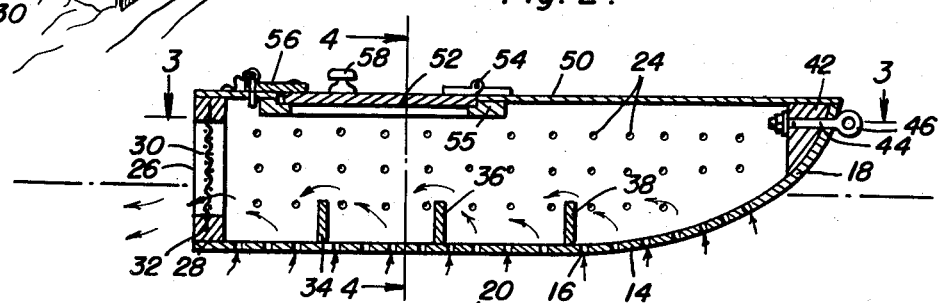
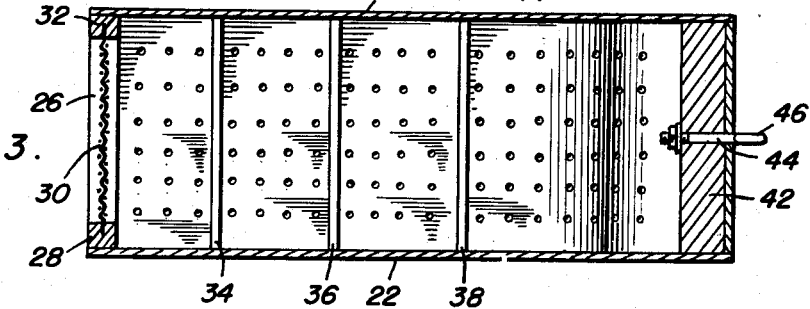
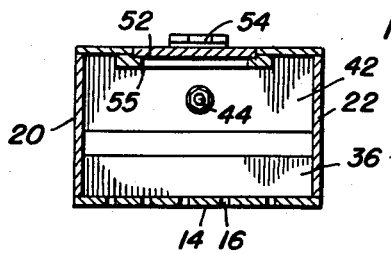
*Inventor*
Robert E. Lee Spotswood
By Clarence A. O'Brien
and Harvey B. Jacobson
*Attorneys*

Patented Nov. 3, 1953

2,657,496

UNITED STATES PATENT OFFICE 2,657,496

LIVE BAIT BOAT

Robert E. Lee Spotswood, Mobile, Ala., assignor of fifty per cent to Irving J. Greenwald, Mobile, Ala.

Application September 29, 1949, Serial No. 118,558

1 Claim. (Cl. 43—55)

This invention relates to a live bait receptacle, and more particularly to a receptacle comprising a vessel which may be readily towed behind a fast moving boat or the like.

An object of this invention is to provide a live bait boat which will insure proper protection of all live bait while the bait boat is being towed at low or high speeds behind another boat and which will permit thorough cleaning after such use.

A further object of the invention is to provide a live bait boat having a series of transversely disposed baffles secured to the bottom of the boat, which divide the boat into a series of compartments.

Still another object resides in the provision of spaced baffles which cause a supply of aerated water for habitation by live bait.

It is well known that live bait when emplaced in a conventional receptacle which is positioned in a body of water or towed behind a boat either encloses the bait in a stagnating body of water, or permits the entrance of a stream of water which will injure the bait by its force. Accordingly, it is an object of this invention to provide a strong, durable, and simple bait boat which will avoid these objectionable limitations, while being relatively inexpensive to manufacture and easily towed behind another boat.

These, together with the various ancillary objects of the invention, which will become apparent as the following description proceeds, are attained by this live bait boat. a preferred embodiment of which has been shown, by way of example only, in the accompanying drawings, wherein:

Figure 1 is a perspective view of the live bait boat comprising the present invention being towed behind a speed boat or the like;

Figure 2 is a vertical sectional view as taken along the longitudinal axis of the live bait boat of Figure 1 and showing in greatest detail the compartments which the baffles divide the boat into;

Figure 3 is a horizontal sectional view as taken along line 3—3 in Figure 2; and, Figure 4 is a vertical sectional view as taken along line 4—4 in Figure 3.

With continuing reference to the accompanying drawings, wherein like reference numerals designate similar parts throughout the various views, 10 generally represents a speed boat, cabin cruiser, or the like, behind which the live bait boat generally designated by the reference numeral 12 is adapted to be towed.

The live bait boat 12 comprises a perforated bottom 14 having a series of spaced apertures 16 therein and which is curved upwardly and forwardly at the forward end 18. The upper portion of the forward end 18 of the boat is imperforate. Secured to the bottom are spaced side walls 20 and 22, each having a plurality of spaced apertures 24 therethrough. Secured to the bottom and to the side walls 20 and 22 is a rear wall 26 which comprises a peripheral frame 28 and a wire mesh 30 secured to the peripheral frame by being inserted into grooves 32 therein. As shown, there are three transversely disposed baffles 34, 36 and 38 which extend from one side wall to the other and are attached to the side walls and to the bottom 14.

A top panel 40 is secured to the side walls 20 and 22, to the end wall 26 and to the forward tip of the forward portion 18 of the bottom 14. Between the top 40 and the forward portion 18 of the bottom 14 is placed a substantially triangular block 42 through which a suitable draft bar 44 having an eye 46 at its frontmost end is bolted. The top 40 is provided with an aperture in which cover plate 52 is hingedly, as at 54, emplaced. The cover plate 52 is supported by a peripheral retainer 55 surrounding the aperture. The plate 52 in its closed position rests upon the retainer 55 and is held thereon by a catch 56 which is rotatably secured to the cover for selective engagement over the cover plate 52. A knob 58 is secured to the cover plate for lifting it.

This live bait boat planes when towed and will not drain dry, even when towed at high speed. As the water entering through the apertures in the bottom 14 and the sides 20 and 22 will be stopped by the baffles 38, 36 and 34, it will not attain the unrestricted high speed attained when the baffles are not present. Additionally, the water at the bottom of the compartments will not be as turbulent as that above, because of the baffles. The bait, of course, such as shrimp, minnows or the like, will rest upon the bottom preferably so as to remain uninjured, and the water passing over the baffles will become aerated so as to be more easily utilized by the bait for the oxygen content thereof. Additionally, the baffles provide easy means for separating the boat into compartments for different type bait.

From the foregoing, the construction and advantages of this live bait boat are readily apparent, further description is believed to be unnecessary.

However, since numerous modifications will readily occur to those skilled in the art after a consideration of the foregoing specification and accompanying drawings, it is not intended to limit the invention to the precise embodiment of live bait boat shown and described, but all suitable modifications and equivalents may be resorted to which lie within the scope of the appended claim.

Having described the invention, what is claimed as new is:

A live bait boat comprising side walls, a rear wall, a top and a perforated bottom including an upwardly curved bow portion and having an upper imperforate end extending to said top, and a plurality of longitudinally spaced baffles on the bottom extending transversely between said side walls and spaced below the top, said baffles defining a series of relatively calm compartments for the reception of live bait and adapted to receive upwardly flowing water through the perforations, said rear wall having a screened outlet opening therein spaced above said bottom, the side walls having their lowest perforations at a level of substantially the plane of the top edge of the baffles, the rear wall being a screened frame member wherein the sides of the frame member have a vertical dimension sufficient to enable the adjacent baffle and said side wall of the frame member to define a well at the rear of the boat, the location of the lower openings of the side wall of the frame member and the size of the frame member being effectual to cause water within the boat to be deflected upwardly by said baffles when the boat is trolled and permitting a sufficient discharge of water from locations between the baffles to reduce to a minimum creating turbulent conditions in the zones between the baffles.

ROBERT E. LEE SPOTSWOOD.

References Cited in the file of this patent

UNITED STATES PATENTS

| Number | Name | Date |
|---|---|---|
| 337,446 | Scott et al. | Mar. 9, 1886 |
| 506,017 | Ruprecht | Oct. 3, 1893 |
| 523,470 | Hemp et al. | July 24, 1894 |
| 631,377 | McCreery | Aug. 22, 1899 |
| 1,490,868 | Voell | Apr. 15, 1924 |
| 1,619,634 | Roat | Mar. 1, 1927 |
| 1,630,131 | Messinger | May 24, 1927 |
| 2,438,739 | Burruss | Mar. 30, 1948 |